United States Patent
Shiratori et al.

(10) Patent No.: US 6,972,513 B2
(45) Date of Patent: Dec. 6, 2005

(54) ELECTRON EMISSION DEVICE, METHOD OF MANUFACTURING THE SAME, AND IMAGE DISPLAY APPARATUS USING THE SAME

(75) Inventors: Tetsuya Shiratori, Osaka (JP); Koji Akiyama, Neyagawa (JP); Hideo Kurokawa, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 106 days.

(21) Appl. No.: 10/332,969

(22) PCT Filed: Jul. 16, 2001

(86) PCT No.: PCT/JP01/06114

§ 371 (c)(1),
(2), (4) Date: Jan. 14, 2003

(87) PCT Pub. No.: WO02/07180

PCT Pub. Date: Jan. 24, 2002

(65) Prior Publication Data

US 2004/0012327 A1    Jan. 22, 2004

(30) Foreign Application Priority Data

Jul. 19, 2000    (JP) .............................. 2000-218526

(51) Int. Cl.$^7$ .............................................. H01J 1/304
(52) U.S. Cl. ...................................... 313/309; 313/497
(58) Field of Search .............................. 313/495–497, 313/309–311, 351, 336; 315/169.1

(56) References Cited

U.S. PATENT DOCUMENTS

| | | | |
|---|---|---|---|
| 6,028,391 A | 2/2000 | Makishima | |
| 6,545,396 B1 * | 4/2003 | Ohki et al. | 313/309 |
| 6,717,340 B2 * | 4/2004 | Nishimura | 313/310 |

FOREIGN PATENT DOCUMENTS

| | | | | |
|---|---|---|---|---|
| JP | 2000-067736 | * | 3/2000 | ........... H01J 1/304 |
| JP | 2000-067740 | | 3/2000 | |

* cited by examiner

Primary Examiner—Karabi Guharay

(57) ABSTRACT

An object of the present invention is to provide electron emission devices having improved electron convergence.

To this end, an electron emission device of the present invention is such that a cathode electrode, an insulating layer, and a gate electrode are layered on a substrate in an order; an electron emission layer is in a first hole on the substrate penetrating from the gate electrode through the cathode electrode; an upper surface of the electron emission layer is between an upper surface of the substrate and a boundary between the cathode electrode and the insulating layer; at least one of a side surface and a lower surface except for a central area of the electron emission layer contacts the cathode electrode.

By such an electron emission device, electrons are emitted mainly from the peripheral area of the electron emission layer. Accordingly, the electron convergence is improved.

30 Claims, 17 Drawing Sheets

404

PRIOR ART

ELECTRON EMISSION DEVICE, METHOD OF MANUFACTURING THE SAME, AND IMAGE DISPLAY APPARATUS USING THE SAME

TECHNICAL FIELD

The present invention relates to so-called cold-cathode type (field emission type) electron emission devices, methods of manufacturing the same, and image display apparatus using the same. In particular, the present invention relates to the technique to improve convergence of electrons emitted from electron emission devices.

BACKGROUND ART

In recent years, image display apparatuses as thin flat panel display apparatuses have been proposed, in which minute cold-cathode type (field emission type) electron emission devices are disposed on a panel in matrix and phosphor layers are formed on a facing panel. With such a construction, images are displayed when, excited by electrons emitted from the electron emission devices to which driving voltage is applied selectively, the phosphor layers emit light.

In such image display apparatuses, improving the convergence of electrons emitted from the electron emission devices has been demanded in order to support higher resolution of displayed images. Electrons emitted from electron emission devices generally expand at angles in a range of several tens degrees to the orthogonal direction to the substrate; accordingly, the convergence of electrons can easily deteriorate. A conventional art intended to improve the convergence of electrons is taught in Japanese Laid-Open Patent Application No. 2000-67736, for example.

FIG. 17 is a cross-sectional view schematically showing a part of an electron emission device of the above-mentioned prior art.

As shown in FIG. 17, an electron emission device 100 has a construction in which a substrate 2100, a cathode electrode 2300, an insulating layer 2400, and a gate electrode 2500 are layered in an order. In the electron emission device 100, electron emission layer 2700 is disposed in a hole 2600, which penetrates from the gate electrode 2500 into the middle of the cathode electrode 2300. The electron emission layer 2700 is formed in a manner that an upper surface of the electron emission layer 2700 is between the substrate and a boundary between the cathode electrode 2300 and the insulating layer 2400.

In the electron emission device 100 as described above, a concave equipotential surface A is formed as shown by solid line in FIG. 17, for example, when voltage is applied to the gate electrode 2500. Accordingly, field concentration is caused in the area around a center point P of the electron emission layer 2700, from where the electrons are mainly emitted. On the other hand, less electrons are emitted from a peripheral area of a lower surface of the electron emission layer 2700, because the field concentration is hard to occur at the peripheral area in comparison with the center point P. While it is possible that the electrons emitted from the peripheral area causes charge-up at the insulating layer 2400, the amount of charge-up is considered to be small.

Accordingly, since electrons are mainly emitted from the area around the center point P of the upper surface of the electron emission layer 2700, it is considered that an electron beam B1 irradiates straight like a spotlight at the irradiated surface and that the convergence of electrons becomes excellent.

However, it is considered that the conventional electron emission device described above still leaves room for improvement.

The electrons emitted from the center point P of the electron emission layer 2700 expand at angles in a range of several tens degrees to the orthogonal direction to the substrate at emission as shown by electron beams B2 and B3. The electrons are then deflected at the equipotential surface A toward the orthogonal direction to the equipotential surface A, and expand as shown by electron beams B2' and B3'. It is considered that this makes an irradiated area on an irradiated surface large, and the convergence is hardly said to be sufficient. In such cases, it is also difficult for the electrons emitted from the peripheral area of the lower surface of the electron emission layer 2700 to converge, and the charge-up occurs.

As explained above, the conventional electron emission devices still leave much room for improvement in the electron convergence.

In view of the above problem, it is an object of the present invention to provide electron emission devices with improved electron convergence in comparison with the conventional art, methods of manufacturing the same, and image display apparatuses using the same.

DISCLOSURE OF THE INVENTION

To achieve the above object, an electron emission device according to the present invention is an electron emission device in which a cathode electrode, an insulating layer, and a gate electrode are layered on a substrate in an order, and an electron emission layer is disposed in a first hole on the substrate, the first hole penetrating from the gate electrode through the cathode electrode, wherein an upper surface of the electron emission layer is positioned between an upper surface of the substrate and a boundary between the cathode electrode and the insulating layer, and a part of a surface of the electron emission layer is in contact with the cathode electrode, the part of the surface being at least one of a side surface and a lower surface except for a central area.

According to such an electron emission device, while electrons are not easily emitted from the central area of the upper surface of the electron emission layer, electrons are easily emitted from the peripheral area. Since the convergence of electrons emitted from the peripheral area is high, the electron convergence of the electron emission device can be improved.

In addition, considering the balance of the convergence of the electron beam and the distribution of the of electric field intensity, it is desirable that distance between the upper surface of the electron emission layer and the boundary between the cathode electrode and the insulating layer measured in a direction of lamination is in a range of 2% to 15% inclusive of a width of an opening of the first hole.

If the upper surface of the electron emission layer is concave, the electrons emitted from the peripheral area of the electron emission layer can be deflected at a relatively early stage. Accordingly the convergence of electrons is improved. The lower surface of the electron emission layer can be made convex.

Moreover, when the electron emission layer includes a projection on the upper surface, field concentration is easily caused around the projection, and accordingly electron emission is improved.

Such projections on the electron emission layer can be formed more than one, and by adjusting conditions so that the equation $D \geq H/2$ is fulfilled when the height of a projection is H and the distance between two tips of projections is D, it is possible to encourage field concentration.

By the electron emission layer that comprises an emission layer for emitting electrons and an orientation layer for orientating the emission layer, and the emission layer has a concave and a convex on the upper surface according to a surface of the orientation layer, more field concentration occurs at the tip of projections, and accordingly the electron convergence can be improved.

In addition, by disposing an electron emission layer having a second hole in a center, electrons are not emitted from the central area of the second hole, and accordingly the electron convergence can be improved.

Moreover, by the cathode electrode including a protrusion at a rim part of the bottom of the first hole extending toward the central area, the amount of electrons supplied to the peripheral area of the lower surface of the electron emission layer and the amount of electrons to emit from the peripheral area of the lower surface of the electron emission layer increases, and accordingly the electron convergence can be improved.

It is also possible that the cathode electrode is disposed on the substrate with a second cathode electrode interposed therebetween, the second cathode electrode being made of a different kind of conductive material from the cathode electrode, and the second cathode electrode includes a protrusion at a rim part of the bottom of the first hole, the protrusion extending toward the central area.

By the electron emission layer including an electron emission material which is one of a fibrous graphite and a carbon nano-tube, field concentration is easily caused because aspect ratio of such material is very high, and accordingly the electron emission of the electron emission device can be improved.

By the electron emission layer including orientation members having a multi-projection shape, projections formed by multi-projection bodies becomes shaper, and field concentration is easily caused at tips, and accordingly electron emission can be improved.

The other form of the electron emission device according to the present invention is an electron emission device in which a cathode electrode, an insulating layer, and a gate electrode are layered on a substrate in an order, and an electron emission layer is disposed in a first hole on the substrate, the first hole penetrating to the gate electrode through the cathode electrode, wherein an upper surface of the electron emission layer is positioned between an upper surface of the substrate and a boundary between the cathode electrode and the insulating layer, and a distance between the upper surface of the electron emission layer and the boundary between the cathode electrode and the insulating layer measured in a direction of lamination is in a range of 2%–15% inclusive of a width of an opening of the first hole.

With such a range, it is possible to keep a voltage to the cathode electrode within a low range that is commonly used, while improving the electron emission and the electron convergence in comparison with the conventional art.

Another electron emission device of the present invention is an electron emission device in which a cathode electrode, an insulating layer, and a gate electrode are layered on a substrate in an order, and an electron emission layer is disposed in a first hole on the substrate, the first hole penetrating from the gate electrode to the cathode electrode, wherein an upper surface of the electron emission layer is concave.

By such an electron emission device, electrons emitted from the peripheral area of the lower surface of the electron emission layer are deflected at a relatively early stage, and it is considered that the electron convergence is improved in comparison with the conventional art.

Methods of manufacturing electron emission devices of the present invention comprises an electrode forming step for forming cathode electrodes on a substrate, each of the cathode electrodes having penetrating holes, and an electron emission layer forming step for forming an electron emission layer in each of the holes on the substrate, the electron emission layer being formed by applying a paste including an electron emission material and a solvent.

By such methods, it is possible that the cathode electrode includes a hole penetrating through the cathode electrode, and since the substrate forms the bottom of the hole, the processing accuracy of the electron emission layer formed on the substrate. Specifically, the accuracy in size of the electron emission layer and therefore electron emission and the electron convergence can be made uniform.

BEST MODE FOR CARRYING OUT THE INVENTION

Embodiments of the present invention are explained below in reference to the drawings.

[First Embodiment]
[Entire Construction of Image Display Apparatus]

Figure 1:
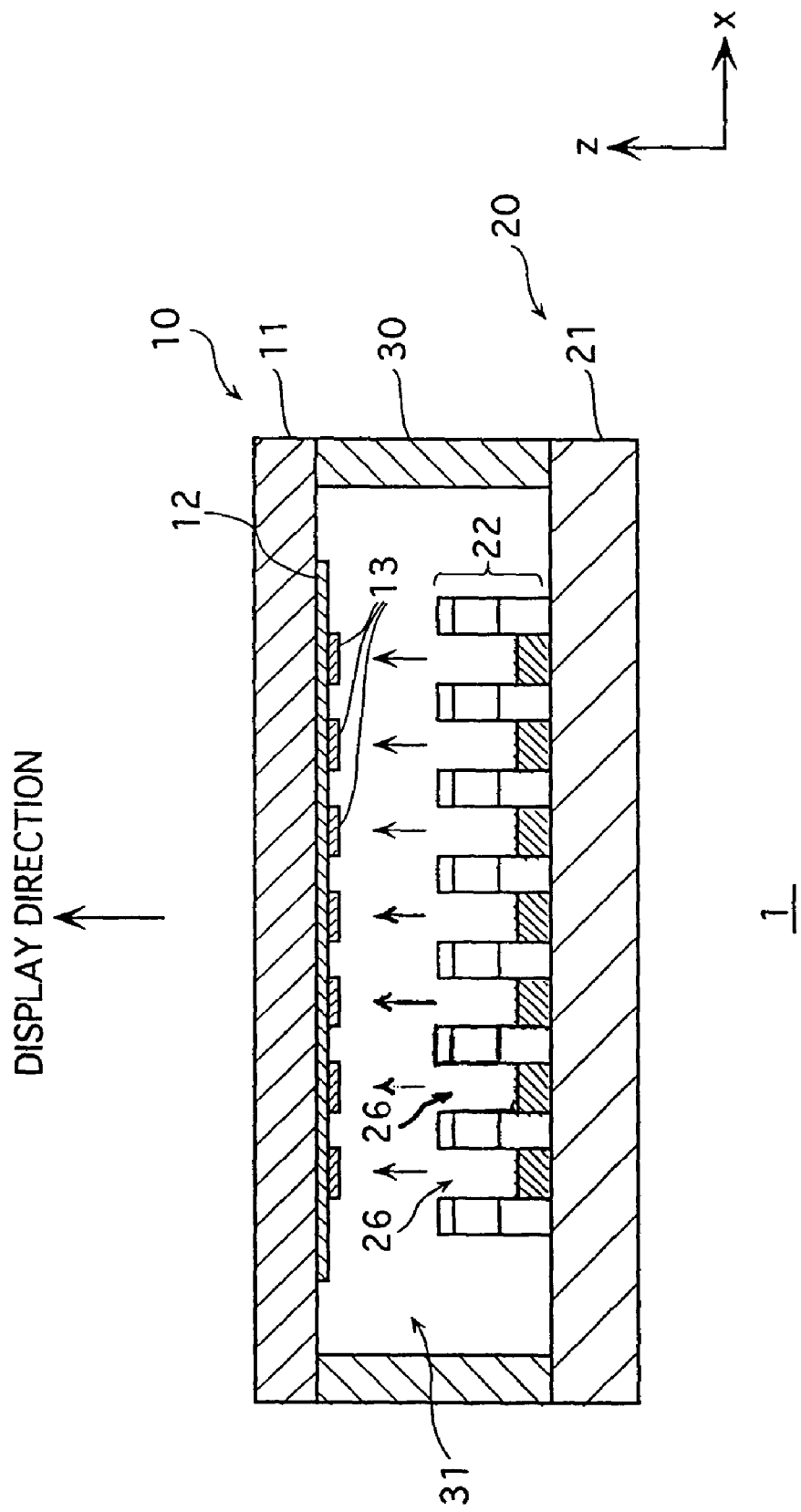
FIG. 1 is a schematic cross-sectional view of an image display apparatus according to the First Embodiment of the present invention.

FIG. 1 is a schematic cross-sectional view of an image display apparatus 1 according to the First Embodiment. The construction of the image display apparatus 1 is explained with reference to FIG. 1.

As shown in FIG. 1, the construction of the image display apparatus 1 is such that a front panel 10 and a back panel 20 are disposed facing each other with a gap material 30 sandwiched therebetween, and space 31 between the panels is maintained in a high vacuum status.

The front panel 10 comprises a front glass substrate 11, an anode electrode 12, and phosphor layers 13, the anode electrode 12 covering a rear side of the front glass substrate 11, and the phosphor layers 13 being disposed on a surface of the anode electrode 12 by pixel.

The front glass substrate 11 is a flat plate substrate made of soda glass, for example. Soda glass is excellent in smoothness, and also desirable in terms of production cost.

The anode electrode 12 is a display electrode made of transparent conductive material such as Indium Tin Oxide (ITO).

The phosphor layers 13 are made of well-known phosphor grains which can be excited to emit light by electron beams. In cases of color image display apparatuses, the phosphor layers each emitting R (red), G (green), and B (blue) light are disposed in an order by pixel.

The back panel 20 comprises a back glass substrate 21 and an electron emission unit 22. A plurality of electron emission devices that can emit electron beams are disposed thereon.

As same with the front glass substrate 11, the back glass substrate 21 is an insulative flat plate substrate made of soda glass. The electron emission unit 22 is formed on the back glass substrate 21 facing the front panel 10.

Figure 2:
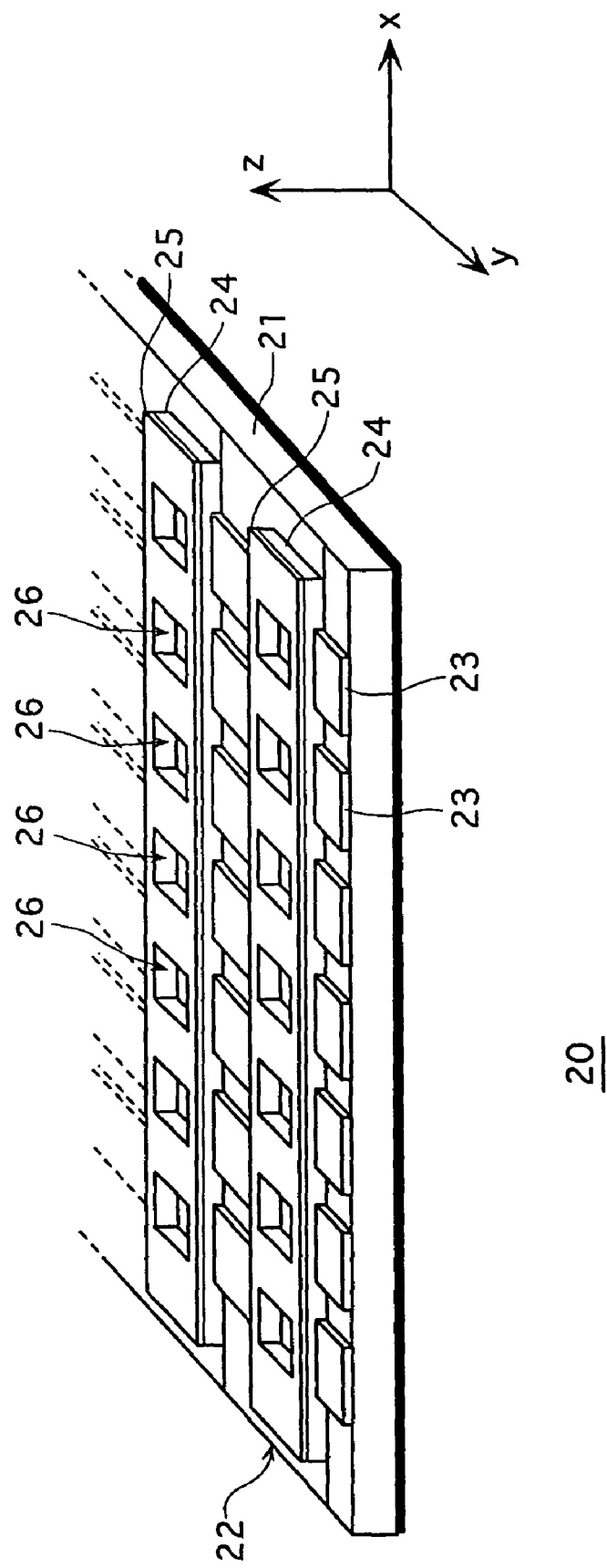
FIG. 2 is a schematic perspective view of a back panel of the image display apparatus of FIG. 1.

FIG. 2 is a schematic perspective view of a back panel 20 to explain the construction of the electron emission unit 22.

As shown in FIG. 2, the electron emission unit 22 comprises the cathode electrodes 23, the insulating layers 24, the gate electrodes 25, and the electron emission layers 27 (FIG. 3), wherein the cathode electrodes 23 are disposed on the back glass substrate 21 in stripe, and the insulating layers 24 with the gate electrodes 25 layered thereon are disposed on the back glass substrate 21 in stripe so as to cross at perpendicular angles to the cathode electrodes 23. The insulating layers 24 and the gate electrodes 25 are layered on the cathode electrodes 23 at intersections each having a first hole 26 penetrating the gate electrode 25 and the insulating layer 24 through the cathode electrode 23. An electron emission layer 27 is disposed in the first hole 26.

When driving the image display apparatus 1, controlling and driving means are connected to each edge of the cathode electrodes 23, the anode electrode 12, and the gate electrodes 25. Then the cathode electrode 23 selected by each controlling and driving means is grounded, and a voltage of 20–70 V to the gate electrodes 25 and a voltage of 8–10 kV to the anode electrode 12 are applied respectively. Then, the electrons are emitted toward the anode electrode 12 from the electron emitting layer 27 (FIG. 3) in the first hole 26 at each intersection of electrodes 23 and 25. The electrons emitted here are transformed into visible lights at the phosphor layer 13 in FIG. 1, and it is possible to display images on the display side of the image display apparatus 1. Although the cathode electrode 23 is grounded in this embodiment, the present invention is not restricted to it and the voltage can be applied to the cathode electrodes 23. In such cases, the amount of voltage applied to the cathode electrodes 23 should be applied to the voltages to be applied to the gate electrodes 25 and the anode electrode 12 in addition to the voltages applied to the gate electrodes 25 and the anode electrode 12 (20–70 V and 8–10 kV respectively).

[Construction of Electron Emission Unit 22]

Figure 3:
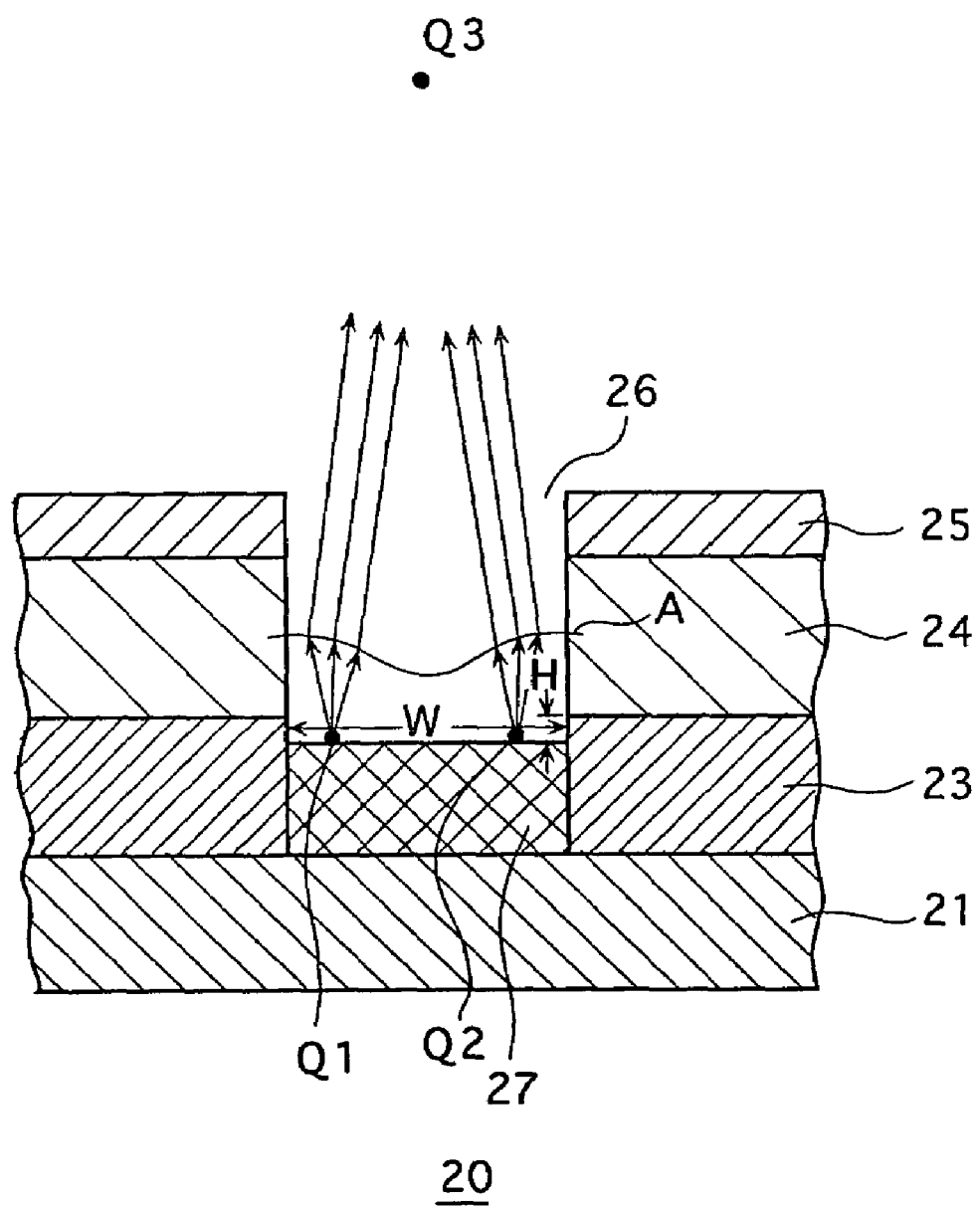
FIG. 3 is a cross-sectional view of the main part of an electron emission device according to the First Embodiment.

FIG. 3 is a cross-sectional view of the main part of the back panel 20 to explain the construction of the electron emission unit 22.

As shown in FIG. 3, the back panel 20 is such that the cathode electrodes 23, the insulating layers 24, and the gate electrodes 25 are layered on the back glass substrate 21, wherein the electron emission layer 27 is disposed in each of the first holes 26 penetrating from the gate electrode 25 through the cathode electrode 23, and the back glass substrate 21 forms the bottom of each first hole 26.

The cathode electrode 23 are made of conductive material such as aluminum and chromium so that the cathode electrode 23 can supply electrons to the electron emission layer 27. The cathode electrode 23 is formed to be 50 μm in thickness, for instance. Although it is desirable to use material having less wiring resistance, there is not particular limitation about the material used.

The insulating layer 24 is for insulating the cathode electrode 23 from the gate electrode 25, made of ceramic material such as alumina as insulating substance. The insulating layer 24 is formed in thickness of 50–100 μm. Material of the insulating layer 24 is not limited to the insulating substance, and material with a very high ohmic value can be used if the potential difference between the cathode electrode 23 and the gate electrode 25 can be maintained at a degree that electron can be emitted. In terms of the prevention of charge-up, such semi-conductive material are desirable in some cases.

The gate electrode 25 has a function of deriving electrons from electron emission layer 27, and is made of a conductive material similar to the cathode electrode 23 in a thickness around 50 µm, for instance.

The electron emission layer 27 emits electrons supplied by cathode electrode 23. The electron emission layer 27 is a layer, made of carbon material such as carbon fiber and carbon nano-tube having a very large aspect ratio, in which carbon material gathers so that the orientation direction becomes random. The carbon material has a property that it is stable and excellent in electron emission since it includes a broken part in a σ linkage of a hexa-carbocyclic ring, in addition to the property that electric concentration is easily caused and it is excellent in electron emission property due to its large aspect ratio (100 or more, for example).

The electron emission layers 27 are formed so that a lower surface of the electron emission layers 27 contact directly to the back glass substrate 21, and by doing so, the cathode electrodes 23 only contact with a side surface of the electron emission layers 27 without contacting the lower surface of the electron emission layers 27. Accordingly, when the image display apparatus 1 is driven, electrons are supplied to the electron emission layers 27 through the side surface connecting to the cathode electrodes 23. Also, the electrons are emitted mainly from a peripheral area of the upper surface of the electron emission layers 27 closer to the part where the electrons are supplied.

It is considered that the electrons emitted from the peripheral area of the upper surface of the electron emission layers 27 can be easily converged against the irradiated surface. Reasons are explained below.

Electrons emitted from the peripheral area of the upper surface of the electron emission layer 27, points Q1 and Q2 shown in FIG. 3, for example, usually expand at angles in a range of several tens degrees. The electrons emitted from points Q1 and Q2 are then appeared to be deflected toward a converging point Q3 in an almost collimated state, even when deflected perpendicularly against the equipotential surface A, because the equipotential surface A around the converging point Q3 is relatively flat. Specifically, the electrons emitted from points Q1 and Q2 converge and irradiate at the converging point Q3, like a spotlight.

On the other hand, electrons are also emitted from around a center point of the electron emission layers 27. However, the distance between the center point and the cathode electrodes 23 are larger than the distance between the peripheral area of the electron emission layers 27. Therefore it is considered that electrons supplied around the center point is small, and accordingly that few electrons are emitted from the central area.

Specifically, by having such a construction that the cathode electrodes 23 do not touch the central area of the bottom of the electron emission layers 27, and is in contact only with a peripheral area of the bottom and the side part of the electron emission layers 27, it is possible to suppress the amount of electrons emitted from the center point P of the electron emission layers 27, where the convergence is low, and it is also possible to relatively increase the amount of electrons emitted from the edge of the upper surface Q1 and Q2 where the convergence is good. As a result, it is possible to improve the convergence toward the converting point Q3 in comparison with the conventional art.

The electron emission layer 27 is disposed in a manner that the upper surface of the electron emission layer 27 is formed between the back glass substrate 21 and the boundary between the cathode electrode and the insulating layer 24. It is desirable that the distance H is within the range of 0.02 W to 0.15 W inclusive, when H is distance between the cathode electrode 23 and the insulting layer 24 and W is width of an opening of the first hole 26 at the boundary between the cathode electrode 23 and the insulting layer 24. (The width of the opening W is measured at a widest part of the opening.)

It is desirable to make the distance H as large as possible in terms of the electron convergence. However, by making the distance H too large, high driving voltage for electron emission becomes necessary and causes a problem that the distribution of electric field intensity on the upper surface of the electron emission layer 27 becomes large. The high driving voltage makes the cost for an apparatus higher. The large distribution of electric field intensity on the upper surface narrows an area for emission, and easily causes decrease of the emission current and deterioration of emission properties. Therefore, considering the balance of the convergence of the electron beam and the distribution of the of electric field intensity, it was proved through the results of experiments and simulation that the range stated above is desirable.

As mentioned above, the convergence is improved in comparison with the convention alert. Thus, it is possible to realize an image display apparatus with higher resolution by using such electron emission devices in image display apparatuses.

[Method of Manufacturing Image Display Apparatus 1]

The major characteristics of methods of manufacturing image display apparatuses according to the present invention are in the method of forming the back panel 20. Therefore, the manufacturing method of the back panel 20 is mainly explained in the followings.

FIGS. 4A–4E each show a cross-sectional view of the main part at each manufacturing step of the back panel 20.

Figure 4A:
FIGS. 4A–4E are cross-sectional views of the main part of the electron emission device, each showing each manufacturing step to explain a method of manufacturing the electron emission devices of the First Embodiment, and each manufacturing step proceeds from FIG. 4A to FIG. 4E in an order.

As shown in FIG. 4A, the back glass substrate 21 is first prepared.

Figure 4B:
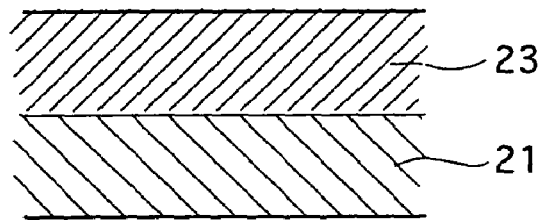

Next, as shown in FIG. 4B, layers to be the cathode electrodes 23 are formed in a desired thickness (50 µm) on the glass substrate 21 by so called thick film formation process, in which a paste containing such as aluminum and chromium is painted, solvent in the paste is dried, and resin contained in the paste is burned up. Thin film formation processes such as spattering and vacuum evaporation using aluminum and chromium can be used here instead of the thick film formation process.

Figure 4C:
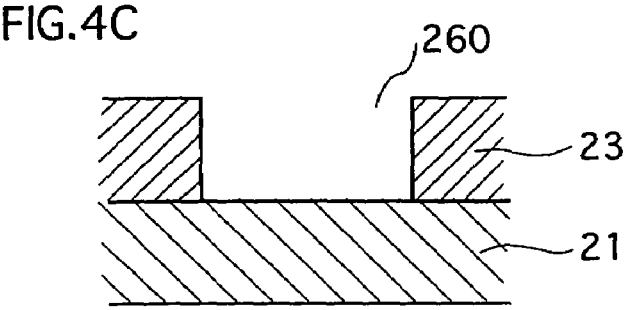

By performing pattern etching on the surface of the layer to be the cathode electrodes 23 formed in a manner stated above, the cathode electrodes 23 are formed in stripes as shown in FIG. 2, having the first holes 260 that penetrate to the back glass substrate 21 as shown in FIG. 4C.

Figure 4D:
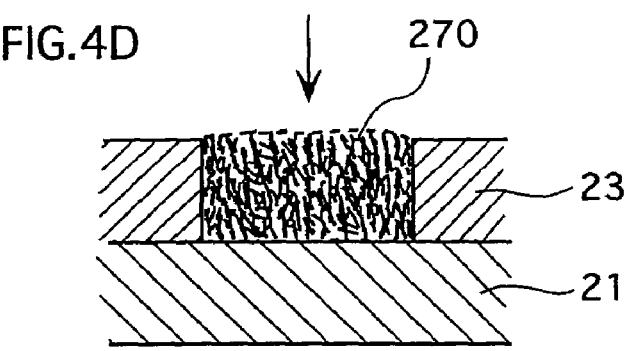

Next, a paste (or dispersion) 270 obtained by mixing electron emission material (such as carbon nano-tube and carbon fiber) and a volatile solvent (such as acetone, ethanol, and vehicle as mixed solution of isoamyl acetate and nitrocellulose) is filled in the first holes 260 by such means like applying using printing and dropping by inkjet (FIG. 4D).

The amount of the paste 270 to fill can be adjusted according to the amount of electron emission material mixed in the paste so as to form the surface of the electron emission layers 27 between the back glass substrate 21 and the boundary between the cathode electrodes 23 and the insulating layers. Then, by making solvent evaporated in the paste 270, the electron emission layers 27 are formed (FIG. 4E).

Figure 4E:
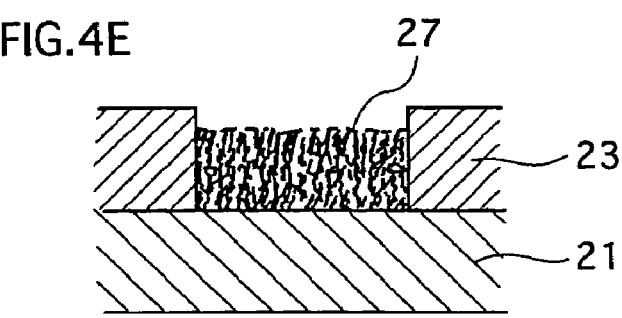

Methods using a squeegee can be also used for forming the electron emission layer 27 explained according to FIGS. 4D and 4E.

Figure 5A:
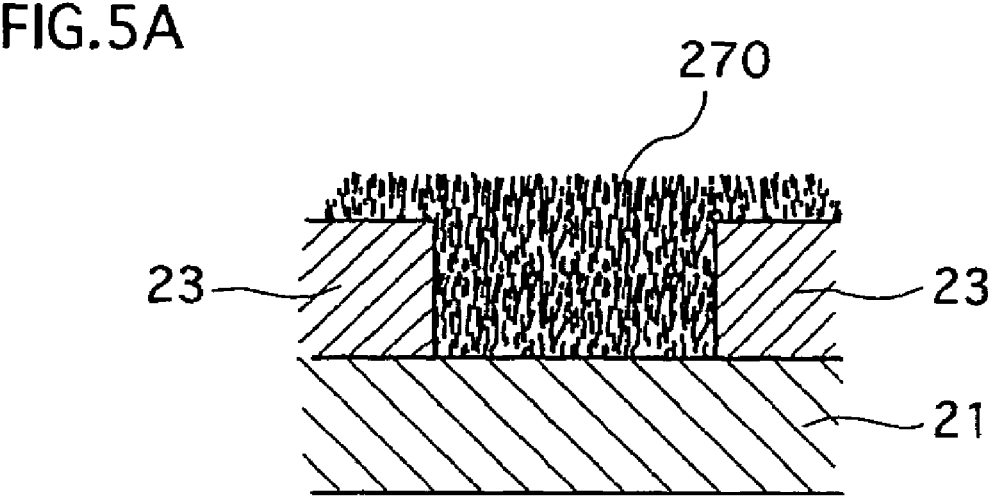
FIGS. 5A–5B are cross-sectional views of the main part of the electron emission device, each showing each manufacturing step to explain different method of manufacturing the electron emission devices from the method illustrated in FIGS. 4A–4E, and each manufacturing step proceeds from FIG. 5A to FIG. 5B in an order.
Figure 5B:
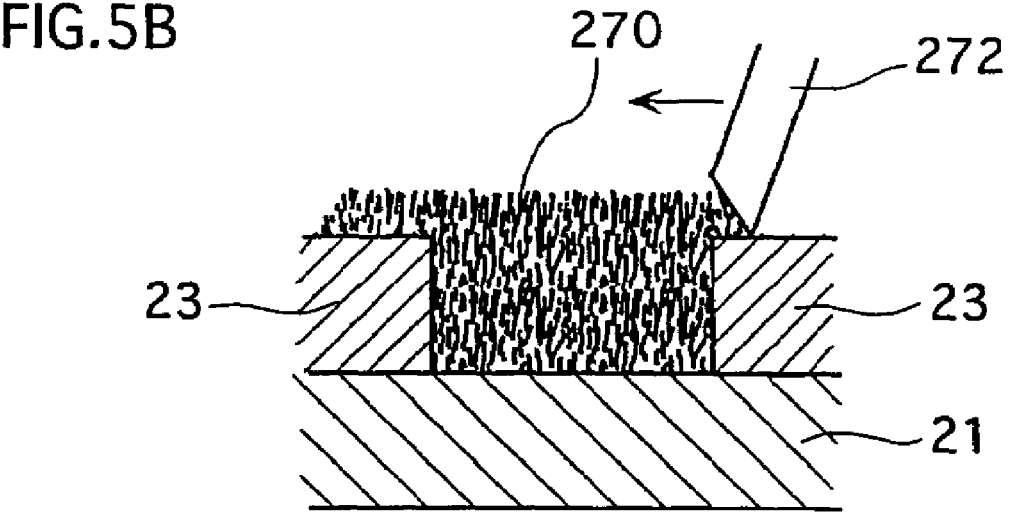

FIGS. 5A and 5B are cross-sectional views of the main part of the back panel 20 at each manufacturing step to explain a method to form the electron emission layers 27 using a squeegee.

As shown in FIG. 5A, the paste 270 is filled into the first holes 260 (FIG. 4C) such that the paste 270 overflows. Next, as shown in FIG. 5B, after a portion of the paste 271 on the upper surface of the cathode electrodes 23 and in the first holes 260 is wiped off using a squeegee, the solvent is dried, and then the electron emission layers 27 (FIG. 4E) in which fibrous electron emission material such as carbon fibers are randomly oriented are formed.

In the step explained above, the amount of the wiped paste 271 filled in the first hole 260 varies according to the resiliency of the squeegee 272. The more flexible the squeegee 272 is, the more paste can be wiped off, and thus the thinner the electron emission layer 27 can be formed. Therefore, the resiliency of the squeegee 272 can be adjusted according to the desired thickness of the electron emission layers to be formed.

Next, in order to perforate the first holes 26 (FIG. 3), the insulating layers 24 and the gate electrodes 25, each being line-shaped and having perforations at the corresponding parts to the first holes 26, are formed by such methods like a thick film forming method. The back panel 20 having the electron emission unit 22 is formed by the insulating layers 24 and the gate electrodes 25 laminated in a manner that edges of each hole of the insulating layers 24 and the gate electrodes 25 overlap, and that the cathode electrodes 23 and a lamination of the insulating layers 24 and the gate electrodes 25 cross orthogonally.

On the other hand, the front panel 10 is obtained by forming a film made of ITO on the front glass substrate 11 using vacuum evaporation first, and next, forming phosphor layers 13 in stripe on the surface of the film made of ITO using such methods as printing.

Finally, the image display apparatus 1 is formed by attaching the gap material 30 around the back panel 20 and adhering the back panel 20 with the front panel 10 facing each other under high vacuum.

Figure 17:
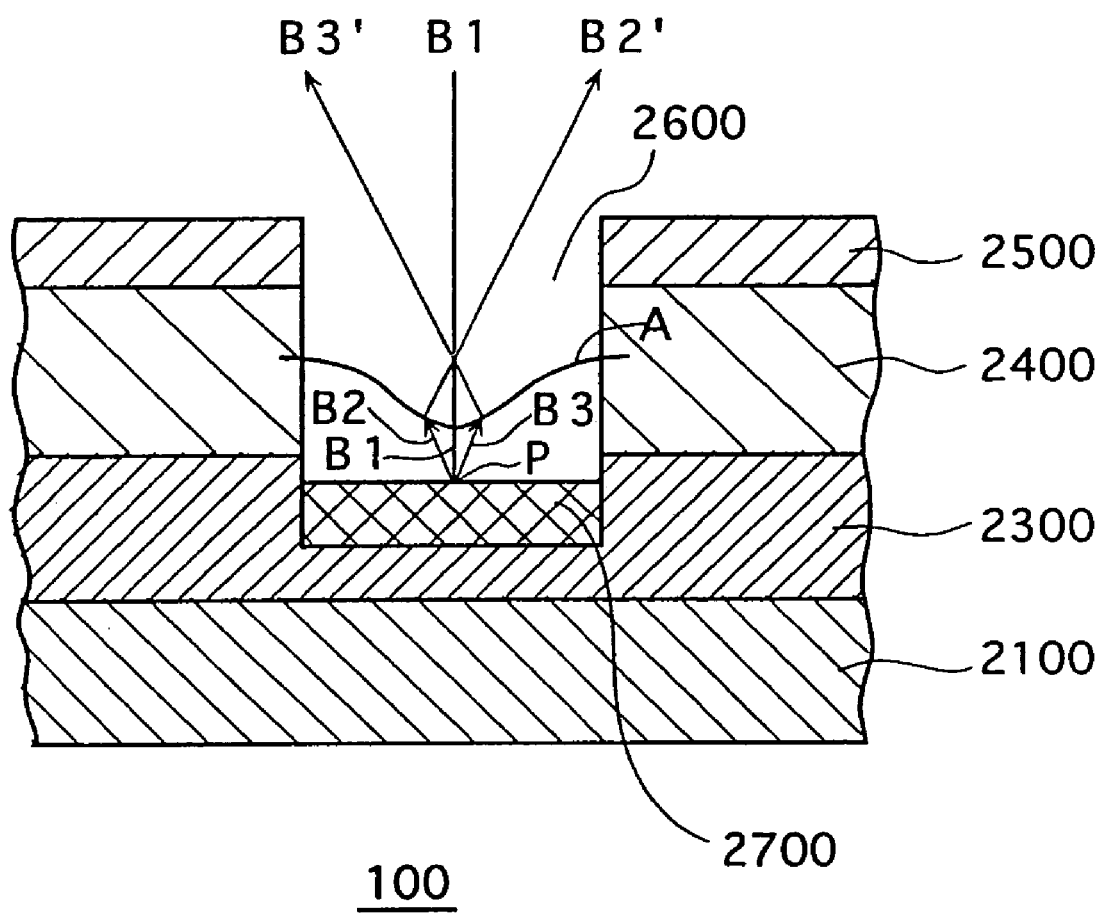
FIG. 17 is a cross-sectional view of the main part of a conventional electron emission device

In the case of the conventional electron emission device explained according to FIG. 17, the accuracy in distances between the electron emission layers 2700 and boundaries between the cathode electrodes 2300 and the insulating layers 2400 in a direction of lamination (corresponds to the distance H in FIG. 3) depends on the processing accuracy in thickness of the cathode electrodes 2300 and the electron emission layers 2700 as well as the processing accuracy in the bottoms of holes 2600. While it is relatively easy to control the processing accuracy of the electron emission layers 2700, controlling the processing accuracy of the bottoms of the holes 2600 is difficult and accuracy in size of the electron emission layers 2700 becomes low. Accordingly, it is considered to be difficult to uniformize the emission properties of each electron emission device.

On the other hand, in the case of the First Embodiment of the present invention, the accuracy in the distance H of FIG. 3 only depends on the accuracy in the thickness of the cathode electrodes 23 and the electron emission layers 27, since the electron emission layers 27 are formed directly on the back glass substrate 21. Accordingly, it is unnecessary to consider the processing accuracy of the first holes 26. In addition, it is relatively easy to control the accuracy in thickness of the cathode electrodes 23 and the electron emission layers 27, and accordingly it is also relatively easy to make the emission property of each electron emission device uniform. Therefore, according to the manufacturing method of this embodiment, it is possible to make emission properties of the electron emission device uniform in comparison with the conventional art.

MODIFIED EXAMPLES (1) In the above embodiment, the electron emission layers 27 are formed so that an entire lower surface of the electron emission layer 27 is in contact with the back glass substrate. However, the present invention is not restricted to this embodiment, and can be realized by such a construction in which the lower surface except for a central area of the electron emission layer is in contact with the cathode electrode.

Figure 6:
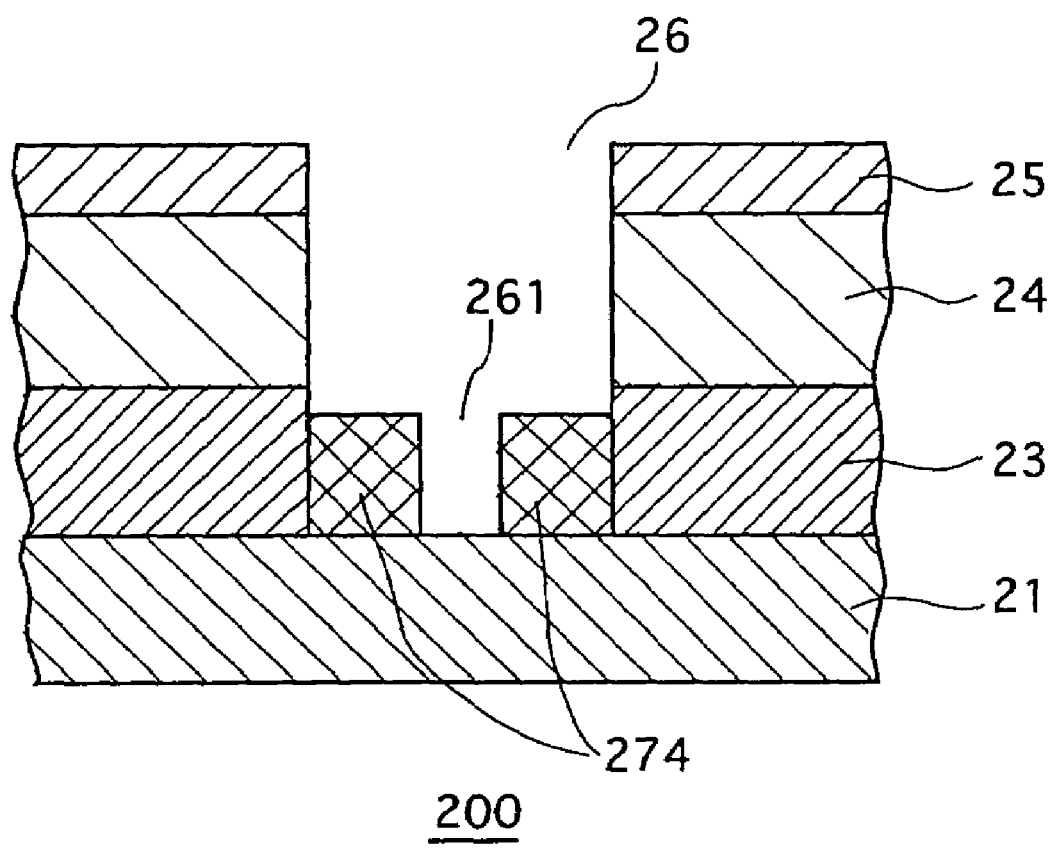
FIG. 6 is a cross-sectional view of the main part of the electron emission device to explain a modified example of the electron emission device according to the First Embodiment.

FIG. 6A is a cross-sectional view of the main part of the back panel 200 of this modified example. Note that this modified example and the above First Embodiment only differ in the construction of the electron emission layers. Members having the same reference numbers as in FIG. 3 are the same components, and therefore, detailed explanation is left out to simplify.

As shown in FIG. 6A, while an electron emission layer 274 basically has the same construction with the electron emission layer 27 of FIG. 3, the electron emission layer 274 having a second hole 261 penetrating to the back glass substrate 21 around the central area of the electron emission layer 274 has a ring-shaped construction when viewed from the top.

By such a construction, the electron emission layer is not disposed at the second hole 261 corresponding to the central area of the bottom of the first hole 26. Accordingly, electron emission around the central area of the upper surface of the electron emission layer, whose convergence is low like the conventional art, is completely prevented. Therefore, it is considered that the convergence of electrons is further improved in comparison with the First Embodiment.

(2) Another construction in which the electron emission layer does not contact the cathode electrode at the central area of the lower surface of the electron emission layer is as following. The present invention can be also realized by such a construction.

Figure 7A:
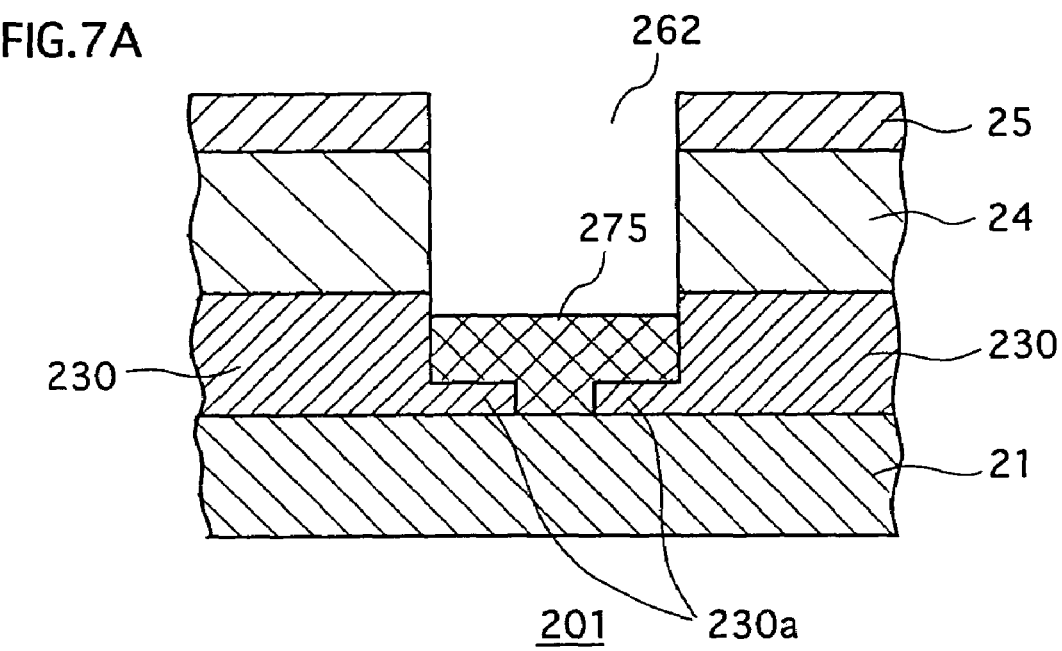
FIG. 7A is a cross-sectional view of the main part of the electron emission device to explain another modified example of the electron emission device according to the First Embodiment.

FIG. 7A is a cross-sectional view of the main part of a back panel 201 of this modified example. Note that this modified example and the above First Embodiment only differ in shapes of the electron emission layer and the cathode electrode. Members having the same reference numbers as in FIG. 3 are the same components, and therefore, detailed explanation is left out to simplify.

As shown in FIG. 7A, a cathode electrode 230 includes a protrusion 230a that extends toward a first hole 262. By such a construction, an electrode emission layer 275 contacts with the back glass substrate 21 at the central area, and with the cathode electrode 230 at the peripheral area. Accordingly, the contacting area at the peripheral area of the lower surface of the electron emission layer 275 with the cathode electrode 230 becomes larger, and more electrons can be emitted from the peripheral area of the upper surface of the electron emission layer 275. Therefore, the convergence of electrons can be improved in comparison with the First Embodiment.

Figure 7B:
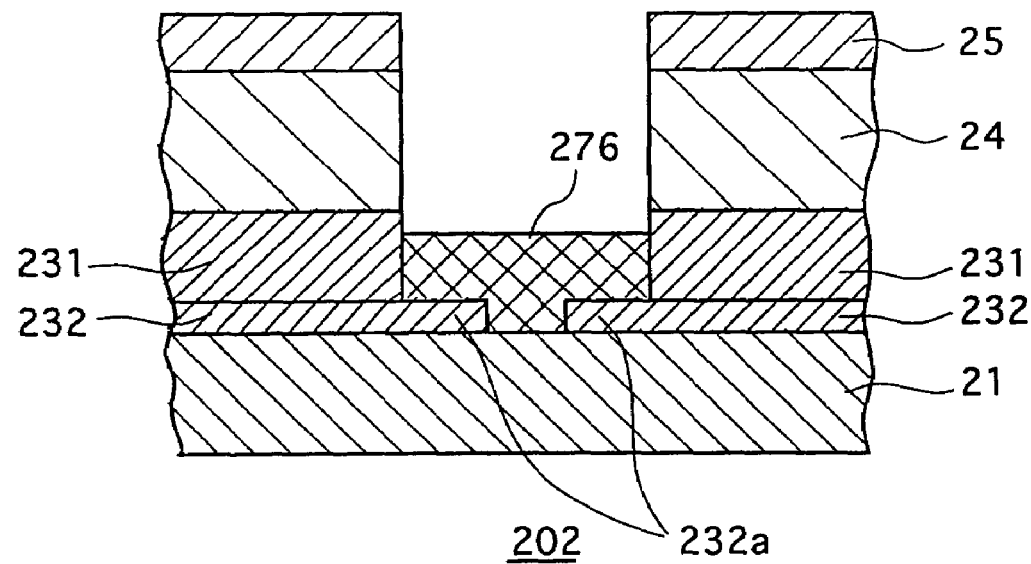
FIG. 7B is a cross-sectional view of the main part of the electron emission device to explain the modified example of the electron emission device according to the First Embodiment.

In addition, as illustrated by a back panel 202 in FIG. 7B, the cathode electrode can be made of two types of conductive layers 231 and 232, and a protrusion 232a can be formed.

[Second Embodiment]

The image display apparatus according to the Second Embodiment has a similar construction with the image display apparatus described in the First Embodiment, and is only different in a shape of electron emission layers of a back panel, and therefore, explanation about the electron emission layer is mainly described below.

While, in the First Embodiment described above, the upper surface of the electron emission layer is formed almost flat, an upper surface of the electron emission layer of the Second Embodiment is concave.

Figure 8:
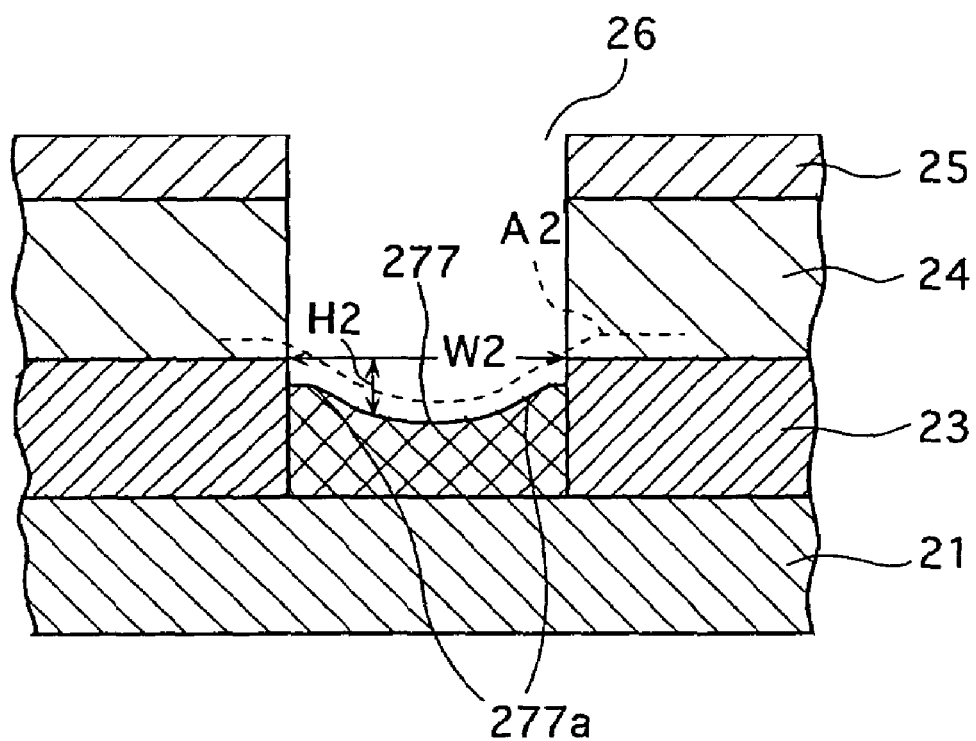
FIG. 8 is a cross-sectional view of the main part of the electron emission device according to the Second Embodiment of the present invention.

FIG. 8 is a cross-sectional view of a back panel 203 according to the Second Embodiment. Note that members having the same reference numbers as in FIG. 3 are the same with the First Embodiment, and therefore detailed explanation is left out.

As shown in FIG. 8, an electron emission layer 277 having a concave upper surface (hereinafter referred to as concave lens shape), where the central area is low and the peripheral area rises, is formed in a first hole 26.

By forming the upper surface of the electron emission layer 277 in the concave lens shape, a peripheral area 277a of the electron emission layer 277 becomes closer to an equipotential surface A2 shown in a dashed line in FIG. 8. The electrons emitted from the peripheral area 277a are deflected to orthogonal directions against the equipotential surface A2 at a relatively early stage. The equipotential surface A2 near a deflection point is relatively flat and therefore emitted electrons are almost collimated in appearance. Accordingly, it is considered that the convergence of the electrons improves in comparison with the First Embodiment.

The upper surface of the electron emission layer 277 is formed between an upper surface of a back glass substrate 21 and a boundary between a cathode electrode 23 and a insulating layer 24. From the same reason with the First Embodiment, considering the balance of the convergence of the electron beam and the distribution of the of electric field intensity, it is desirable that distance H2 between the upper surface of the cathode electrode 23 and the upper surface of the electron emission layer 277 is within a range of 2% to 15% inclusive of width of an opening W2 of the cathode electrode 23.

In order to form the electron emission layer 277 having such a shape, a method similar to the method explained in the First Embodiment in reference with FIGS. 4 and 5 can be used. In the case of the Second Embodiment, however, a solvent included in a paste 270 (FIGS. 4 and 5) has to be selected from solvents having a contact angle of 90 degrees or less against the cathode electrode 23. By selecting such a solvent, the paste 270 forms the contact angle of 90 degrees or less against the cathode electrode 23 after either applying the paste 270 and wiping paste using the squeegee, and accordingly the upper surface of the paste 270 forms a concave lens shape. By drying the solvent in the paste while maintaining such status, the electron emission layer 277 is formed in a concave lens shape.

MODIFIED EXAMPLE

In the above Second Embodiment, the upper surface of the back glass substrate 21 in contact with the electron emission layer 277 is flat. However, the present invention is not limited to it, and the upper surface of the back glass substrate 21 can be formed in a concave lens shape.

Figure 9:
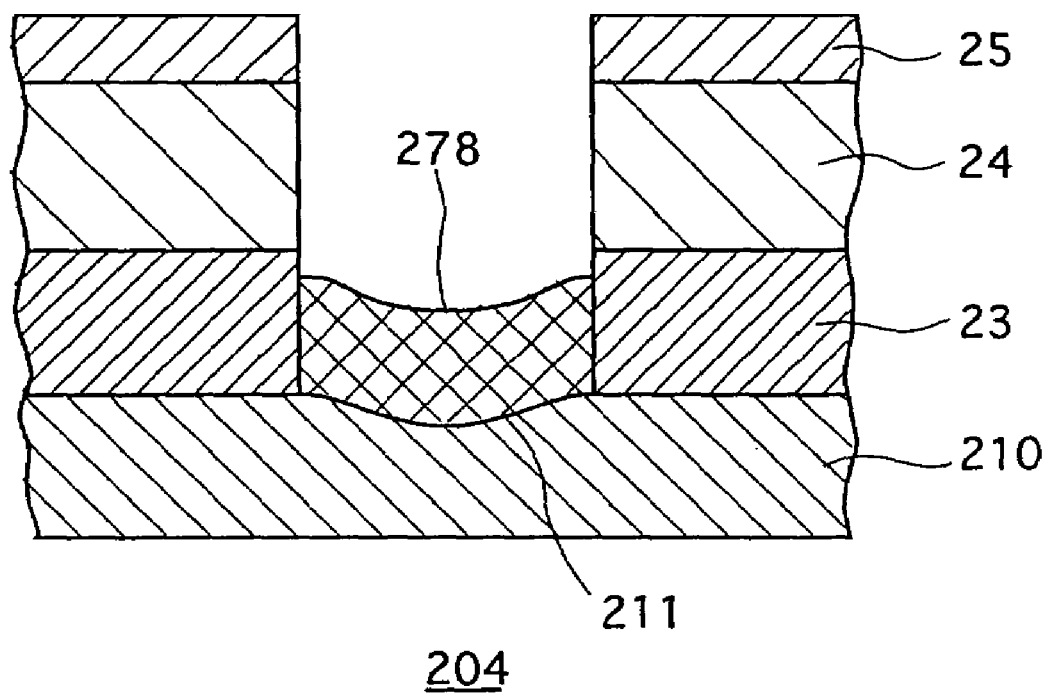
FIG. 9 is a cross-sectional view of the main part of the electron emission device to explain a modified example of the electron emission device according to the Second Embodiment of the present invention.

FIG. 9 is a cross-sectional view of a back panel 204 in this modified example. Note that this modified example only differs in the shapes of the electron emission layer and the back glass substrate. Members having the same reference numbers as in FIG. 8 are the same components, and thus, detailed explanation is left out to simplify.

As shown in FIG. 9, in this modified example, the back glass substrate 210 having a concave 211 on the upper surface is in contact with an electron emission layer 278. By applying a paste containing electron emission material similar to the First Embodiment to the concave 211, the electron emission layers 278 is formed such that the electron emission layers 278 has a concave shape according to the shape of the concave 211.

The concave 211 can be formed by using well-known methods including methods for applying chemical treatment on the back glass substrate 21 such as etching, methods of mechanical processing such as sand blasting, methods of forming film using such as spraying and printing, and the like.

By adjusting the curve of the concave 211, it is possible to adjust the concave lens shape of an upper surface of the electron emission layer 278, because the upper 15 surface of the electron emission layer 278 is formed according to the curve of the concave 211.

[Third Embodiment]

The image display apparatus according to the Third Embodiment has a similar construction with the image display apparatus described in the First Embodiment, and is only different in the shape of electron emission layers of aback panel. Therefore, explanation about the electron emission layer is mainly described below.

While, in the First Embodiment described above, the upper surface of the electron emission layer is formed almost flat, an upper surface of the electron emission layer of the Third Embodiment has a concave and a convex.

Figure 10:
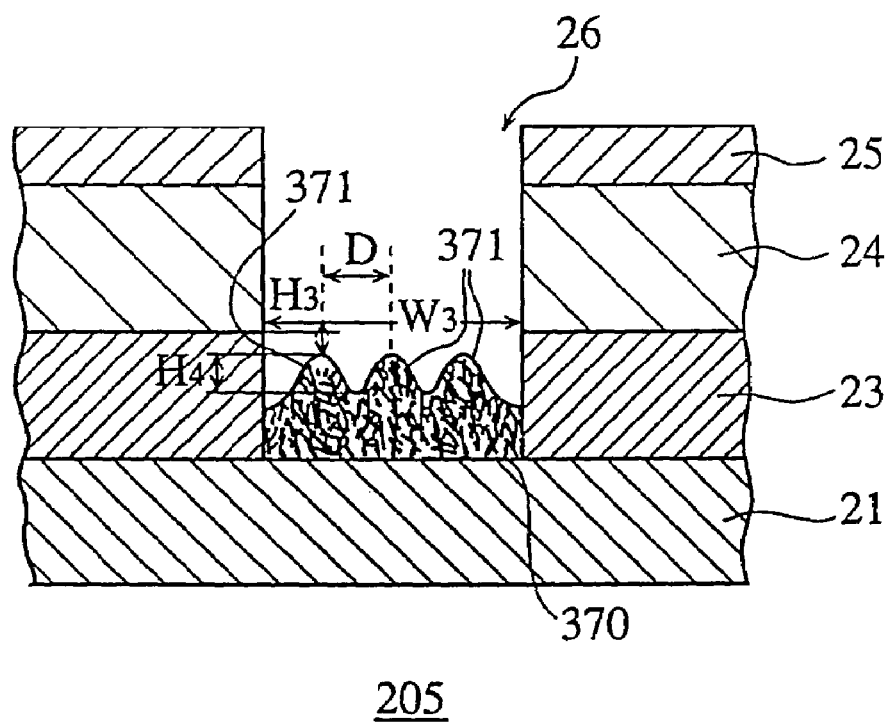
FIG. 10 is a cross-sectional view of the main part of the electron emission device according to the Third Embodiment.

FIG. 10 is a cross-sectional view of a back panel 203 according to the Third Embodiment. Note that members having the same reference numbers as in FIG. 3 are the same with the First Embodiment, and therefore, detailed explanation is left out.

As shown in FIG. 10, an electron emission layer 370 having a plurality of projections 371 is formed in a first hole 26. The projections 371 are formed such that tips thereof are formed between the back glass substrate 21 and a boundary between a cathode electrode 23 and an insulating layer 24. Distance H3 is distance between the tip of the projection 371 and the boundary between the cathode electrode 23 and the insulating layer 24 in a direction of lamination. As in the First Embodiment, it is desirable to set the distance H3 within 2% to 15% inclusive of width of an opening W3 of the cathode electrode 23, considering the balance of the convergence of the electron beam and the distribution of the of electric field intensity.

As described above, by forming the projections 371, field concentration at the tips of the projections 371 could easily occur. Also, as in the First Embodiment, the electron emission layer 370 is made of material having high aspect ratio such as carbon fiber and carbon nano-tube, and has such a construction that field concentration could occur even more easily. Accordingly, the electron emission properties are further improved in comparison with the First Embodiment.

It is desirable to form as many projections 371 as possible in terms of emission properties, because more projections cause more field concentration and thus the number of point emitting electrons increases. However, too many projections results in high-density and field concentration at the projections 371 becomes hard to occur. Thus, it is desirable that density of the projections 371 formed is such that the equation below is fulfilled;

$$D \geq H4/2.$$

In the equation, D indicates the distance between two tips of the adjacent projections 371 in an orthogonal direction of lamination, and H4 indicates the height of the tip of the projection 371 from the lowest part between the projections 371 on an upper surface of the electron emission layer 370. It has been confirmed through simulations and experiments that the adverse effect to field concentration of the adjacent projections 371 can be prevented by filling the equation.

As has been described, by forming the projections 371 on the upper surface of the electron emission layer 370, the effect of field concentration becomes higher and electron emission is improved in comparison with the First Embodiment.

MODIFIED EXAMPLES (1) In the above Third Embodiment, the electron emission layer 370 is made of electron emission material such as carbon fiber and carbon nano-tube. However, the present invention is not restricted to this embodiment, and the electron emission layer can be formed by more than one layer made of different kinds of electron emission material.

Figure 11A:
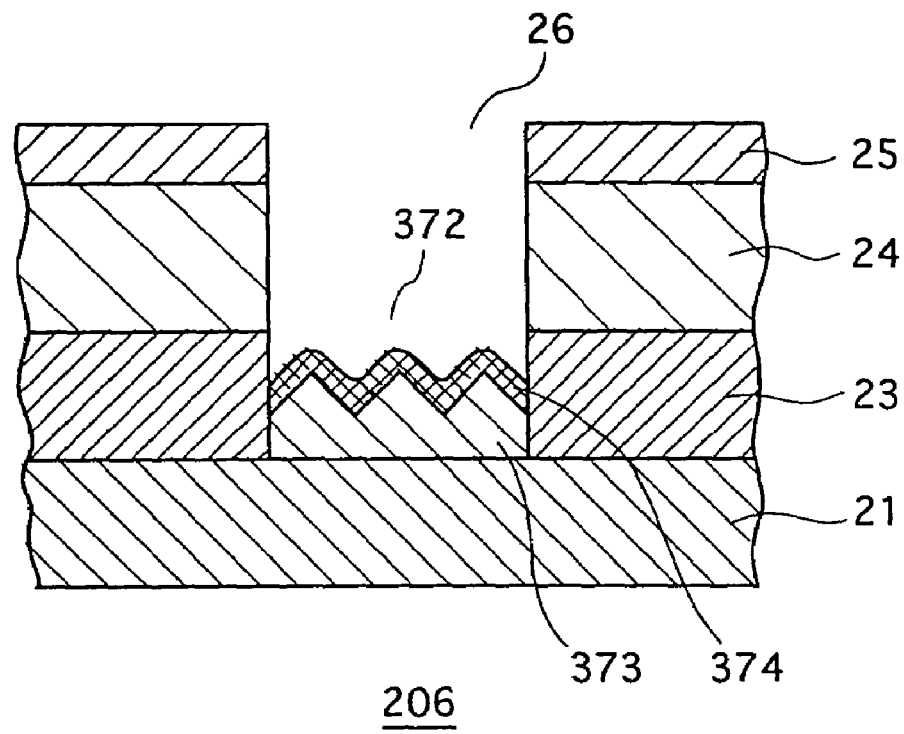
FIG. 11A is a cross-sectional view of the main part of the electron emission device to explain a modified example of the electron emission device according to the Third Embodiment.

FIG. 11A is a cross-sectional view of the main part of a back panel 200 of this modified example. Note that this modified example and the above Third Embodiment only differ in the construction of the electron emission layer. Members having the same reference numbers as in FIG. 10 are the same components, and therefore, detailed explanation is left out.

As shown in FIG. 11A, an electron emission layer 372 is made from an orientation layer 373 and an emission layer 374, and the emission layer 374 is laminated on the orientation layer 373 in the first hole 26.

The orientation layer 373 having projections on the upper surface thereof is for orientating the emission layer 374 in a shape having a concave and a convex according to the projections. The orientation layer 373 is made of conductive material such as ZnO, in view of the role of supplying electrons and preventing the charge-up of electrons emitted from the emission layer 374.

The emission layer 374 is made of electron emitting material such as carbon fiber and carbon nano-tube as in the Third Embodiment.

The method of forming the electron emission layer 372 is as follows; first, a layer made of conductive material such as ZnO is formed in the first hole 26 by such means as printing. Next, projections are formed on the upper surface of the layer by applying treatment such as etching, and the orientation layer 373 is formed. Then, a paste for forming the emission layer 374 is applied on the orientation layer 373, and the electron emission layer 372 is formed by drying a solvent in the paste.

It is considered that the same effect can be obtained with the Third Embodiment by the electron emission layer having the construction described above.

(2) While, in the above modified example, the orientation layer 373 is formed, orientation members can be used in place of an orientation layer.

Figure 11B:
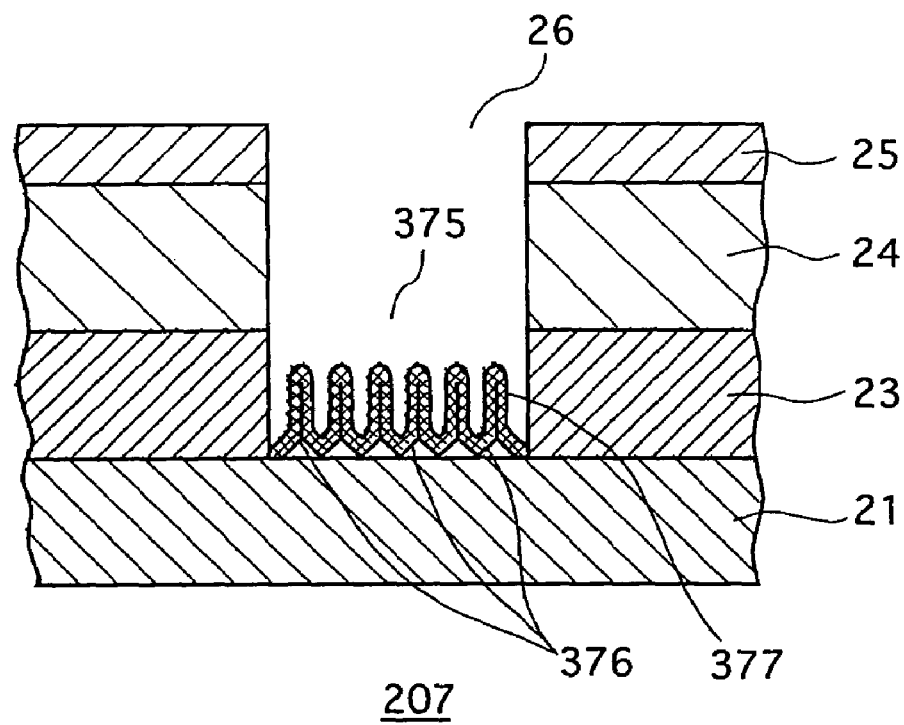
FIG. 11B is a cross-sectional view of the main part of the electron emission device to explain another modified example of the electron emission device according to the Third Embodiment.

FIG. 11B is a cross-sectional view of the main part of a back panel 207 of this modified example.

As shown in FIG. 11B, an electron emission layer 375 is made of orientation members 376 and an emission layer 377.

The orientation members 376 are made of ZnO whisker (such as Pana-Tetra manufactured by Matsushita AMTEC Co., Ltd.) having four projections, each tip of which corresponds to each apex of a tetrahedron, and one of projections elects almost perpendicular against the back glass substrate 21. The orientation members 376 can be made of any kind of multi-projection body having conductivity and a plurality of projections whose tips correspond to apexes of a tetrahedron. Material such as simple substance, oxide, nitride, and carbide of Si, Ti, B, Fe, Sn, and Mg which easily form multi-pedal body whisker can also be used in addition to ZnO whisker.

The emission layer 377 has such a construction that electron emission material such as carbon fiber and carbon nano-tube sticks around the feet of the orientation members 376.

By the above construction, projections for easily causing field concentration are formed sharply on the upper surface of the electron emission layer 375, and field concentration becomes even more easily to occur. Accordingly, it is considered that the electron emission is improved in comparison with the Third Embodiment.

Examples of methods of forming the electron emission layer 375 include a method in which a mixed paste, made of the pastes explained in reference with FIGS. 4 and 5 of the First Embodiment, is applied to the orientation members 376, and the electron emission layer 375 is formed. It is also possible to form the electron emission layer 375 in a following manner. First, by applying dispersion, in which the orientation members are dispersed in advance, in the first hole 26 and by drying the solvent in the dispersion, the orientation members are formed. Then the paste containing the electron emission material is applied. In this way, it is possible to form the electron emission layer 375 in which electron emission material uniformly sticks around the orientation material, even when the mixed paste cannot be made uniformly due to the difference in the specific gravity between the electron emission material and the orientation material in the mixed paste.

[Fourth Embodiment]

The image display apparatus according to the Fourth Embodiment has a similar construction with the image display apparatus described in the First Embodiment, and is only different in that a lower surface of an electron emission layer is formed so as to contact with a cathode electrode on a back panel. Therefore, explanation about the back panel is mainly described below.

While, in the First Embodiment described above, the electron emission layer is formed directly on the back glass substrate, the electron emission layer of the Fourth Embodiment is formed on the cathode electrode as in the conventional art.

Figure 12:
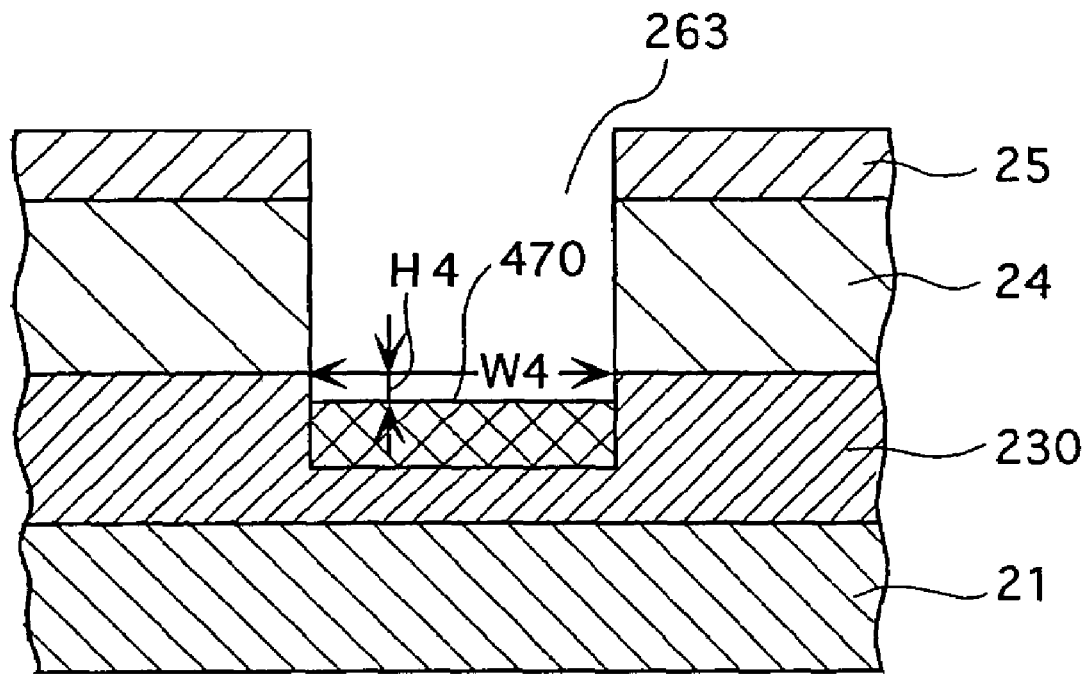
FIG. 12 is a cross-sectional view of the main part of the electron emission device according to the Fourth Embodiment the present invention.

FIG. 12 is a cross-sectional view of a back panel 400 according to the Fourth Embodiment. Note that members having the same reference numbers as in FIG. 3 are the same with the First Embodiment, and therefore, detailed explanation is left out.

As shown in FIG. 12, the back panel 400 has such a construction in which a substrate 21, a cathode electrode 230, an insulating layer 24, and a gate electrode 25 are layered in an order, having first holes 263 penetrating from the gate electrode 25 to the middle of the cathode electrode 230, an electron emission layer 470 is disposed in each of the first holes 263.

An upper surface of the electron emission layer 470 is formed between the back glass substrate 21 and a boundary between the cathode electrode 230 and the insulating layer 24. Moreover, considering the balance of the convergence of the electron beam and the distribution of the of electric field intensity, it is desirable that the upper surface of the electron emission layer is formed in a manner that distance H4 is within a range of 2% to 15% inclusive of width of an opening W4 of the first hole 263 at the boundary between the cathode electrode 230 and the insulating layer 230. The reasons for such restriction are the same with the Second Embodiment.

Specifically, while it is preferable in terms of the electron convergence that the distance H4 is set as large as possible, making the distance H4 too large requires high driving voltage for electron emission, and causes a problem that the distribution of electric field intensity on the upper surface of the electron emission layer becomes large. High driving voltage makes the cost of an apparatus higher, and the large distribution of electric field intensity on the upper surface narrows an area for emission and the decrease of the emission current and the deterioration of emission properties are easily caused. Therefore, considering the balance of the convergence of the electron beam and the distribution of the of electric field intensity, a proportion of the distance H4 and the width W4 are derived from the results of experiments, H4 being the distance between the upper surface of the electron emission layer and the boundary between the cathode electrode and the insulating layer when 100% of electrons pass through the opening at the gate electrode within the range of voltage normally applied to the gate electrodes (20–70 V).

This experiment was carried out under conditions below.

Cathode Electrode: Thickness 50 $\mu$m, Applied Voltage 0 V

Insulating Layer: Thickness 50–100 $\mu$m

Gate electrode: Thickness 50 $\mu$m, Applied Voltage 20–70 V, Width of Opening 0.2 mm Anode Electrode: Applied Voltage 8–10 kV Distance between Gate electrode and Anode Electrode: 0.5–2.0 mm Under above conditions, the experiment was carried out changing the applied voltage to the gate electrode from 20 V to 70 V, and conditions where 100% of electrons pass through the aperture of the gate electrode were examined.

The distance H4 of the electron emission layer was measured each time, using a Scanning Electron Microscope (SEM), and it was confirmed that H4 fell within a range from 4 $\mu$m (20 V) to 30 $\mu$m (70 V). In this experiment, the width of the opening W4 of the cathode electrode was set at 200 $\mu$m. Accordingly, H4/W4 was in the range of 0.02 to 0.15 inclusive.

With such a construction, more electrons can be emitted from the central area of the electron emission layer 470 like the conventional art. However, since the conditions are optimized, charge-up in the insulating layer 24 as in the conventional art does not occur, and 100% of electrons are emitted. Accordingly, the electron convergence is improved in comparison with the conventional art.

The same methods as explained in the First and the Second Embodiments can be used as the method of forming the electron emission layer 470. Note that the cathode electrode 230 having the hole is required to be processed to prevent from penetrating to the back glass substrate 21 by such means as optimizing time duration for etching.

[Fifth Embodiment]

The image display apparatus according to the Fifth Embodiment has a similar construction with the image display apparatus described in the Fourth Embodiment, and is only different in a shape of electron emission layers of a back panel. Therefore, explanation about the electron emission layer is mainly described below.

While, in the Fourth Embodiment described above, the upper surface of the electron emission layer is formed flat, an upper surface of the electron emission layer of the Third Embodiment is formed concave.

Figure 13:
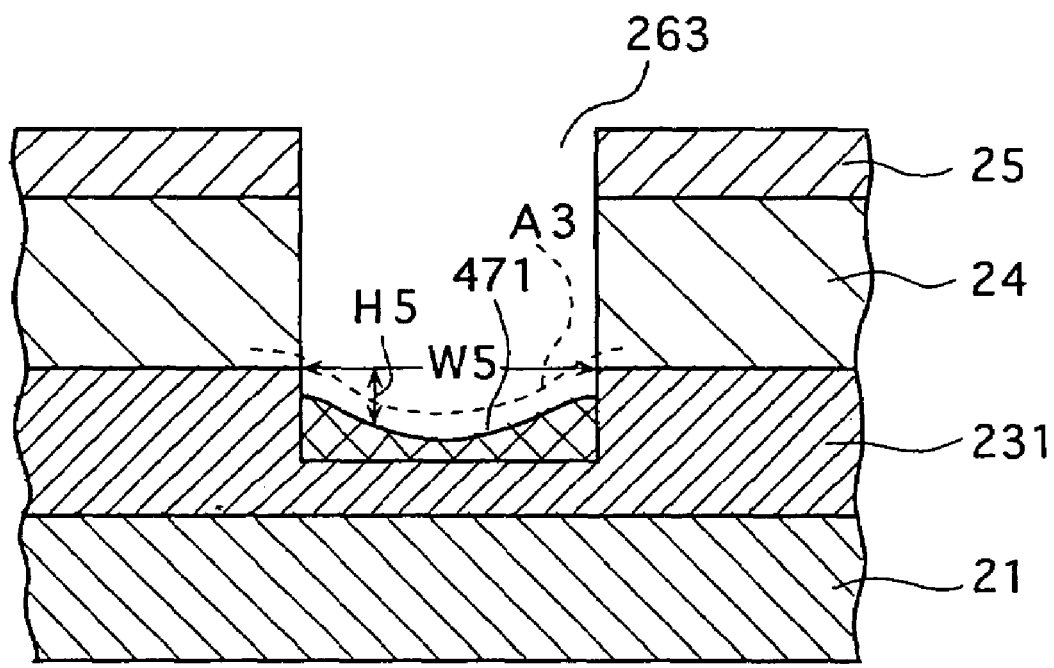
FIG. 13 is a cross-sectional view of the main part of the electron emission device according to the Fifth Embodiment.

FIG. 13 is a cross-sectional view of a back panel according to the Fourth Embodiment. Note that members having the same reference numbers as in FIG. 12 are the same with the Fourth Embodiment, and therefore, detailed explanation is left out.

As shown in FIG. 13, an electron emission layer 471 having an upper surface in a concave lens shape is formed in a first hole 263. By forming the electron emission layer 471 in such a shape, a peripheral area of the electron emission layer 471 becomes closer to an equipotential surface A3 shown in a dashed line in FIG. 13. The electrons emitted from the peripheral area are deflected to orthogonal directions to the equipotential surface A at a relatively early stage. The equipotential surface A near a deflection point is relatively flat and therefore emitted electrons expand almost collimated in appearance and converge.

Accordingly, in comparison with the conventional art, electrons are easily emitted from the peripheral area of the electron emission layer 471, and the amount of electrons emitted from areas having higher convergence than the central area increases, and accordingly, it is considered that the convergence of the electrons improves.

The upper surface of the electron emission layer 471 is formed between a back glass substrate 21 and a boundary between a cathode electrode 231 and a gate electrode 24. From the same reason with the Second Embodiment, considering the balance of the convergence of the electron beam and the distribution of the of electric field intensity, it is desirable that distance H5 between the upper surface of the cathode electrode 231 and the upper surface of the electron emission layer 471 is within a range of 2% to 15% inclusive of width of an opening W5 of the cathode electrode 231.

In order to form the electron emission layer 471, a method similar to the method explained in the Second Embodiment can be used, and a paste for forming the electron emission layer 471 having a contact angle of 90 degrees or less against the cathode electrode 230 may be selected.

Figure 14:
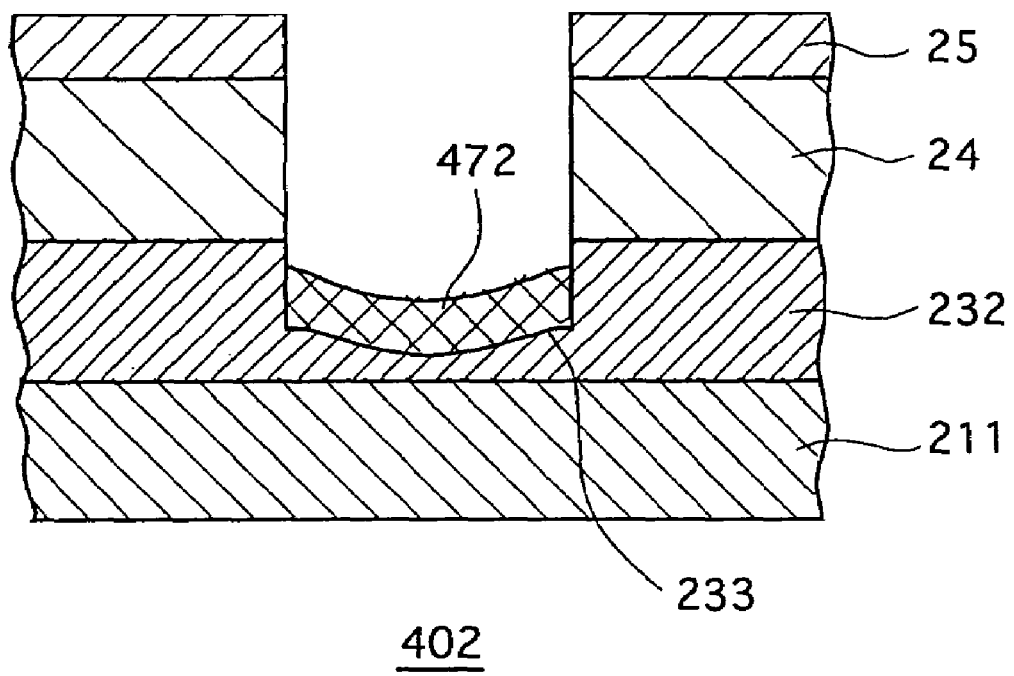
FIG. 14 is a cross-sectional view of the main part of the electron emission device to explain a modified example of the electron emission device according to the Fifth Embodiment.

MODIFIED EXAMPLES (1) As shown in FIG. 14, it is considered that the similar effect can be obtained by forming an electron emission layer 472 whose lower surface is convex on a cathode electrode 232 having a concave surface 233. By forming the cathode electrode 232 having the concave surface 233, the upper surface of the electron emission layer 472 can be formed according to the shape of the concave surface 233, and therefore it is possible to change the shape of the electron emission layer 472 as desired.

Figure 15:
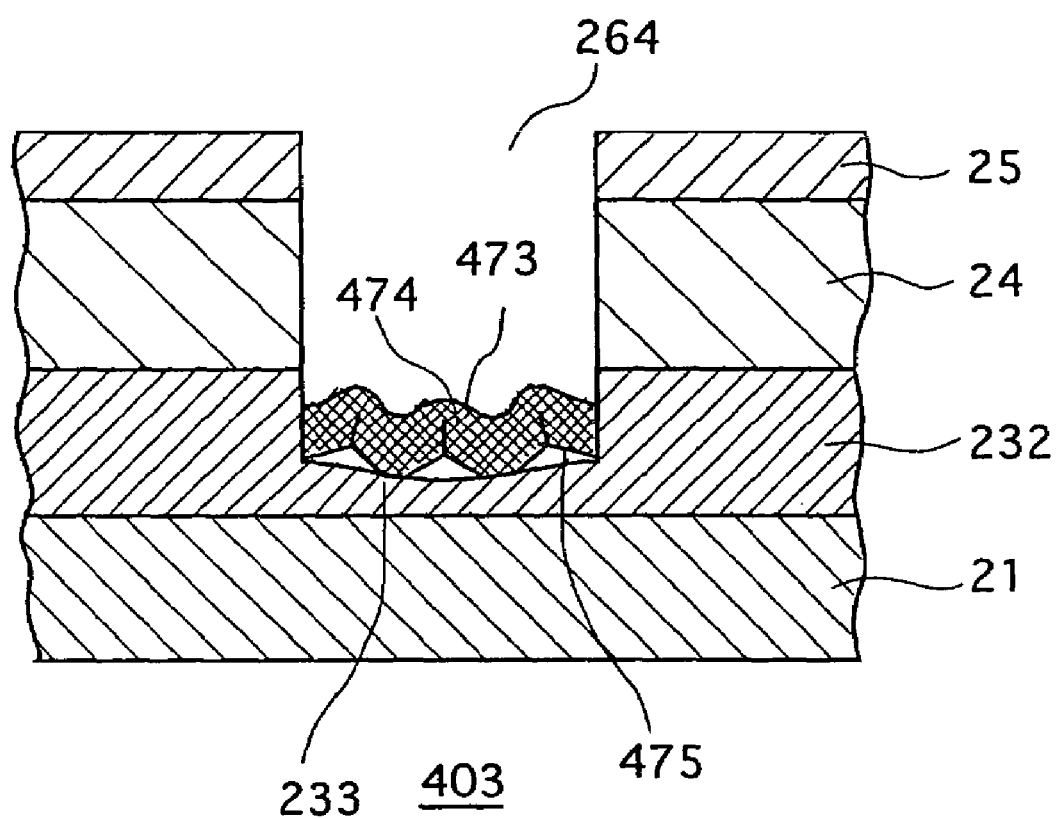
FIG. 15 is a cross-sectional view of the main part of the electron emission device to explain the other modified example of the electron emission device according to the Fifth Embodiment.

(2) In addition, as shown in FIG. 15, it is also desirable that orientation members 475 made of multi-projection body of the Third Embodiment are formed on the concave surface 233 of the cathode electrode 232 in the first hole 264, and then an electron emission material 474 sticks around the orientation members 475.

Figure 16:
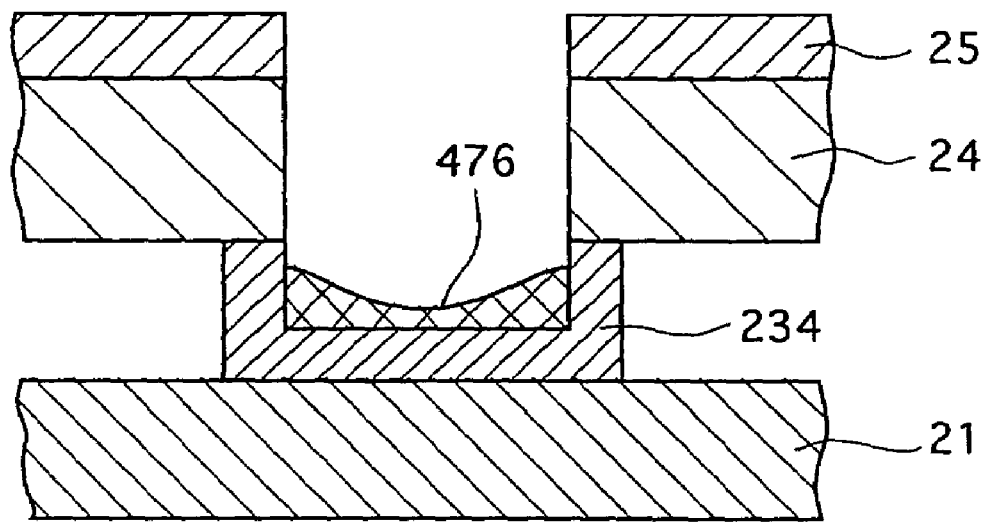
FIG. 16 is a cross-sectional view of the main part of the electron emission device to explain another modified example of the electron emission device according to the Fifth Embodiment.

(3) Moreover, as shown in FIG. 16, it is also desirable that cathode electrodes 234 are disposed by pixel on a back panel 404, instead of disposing the cathode electrodes in stripe.

With such a construction, each of the cathode electrodes 234 can be viewed as a projection in a macroscopic view, and it is considered that field concentration to the electron emission layer 476 can be easily caused. Accordingly, excellent emission properties can be realized by this modified example in comparison with above-mentioned Fifth Embodiment.

INDUSTRIAL APPLICABILITY

Electron emission devices and image display apparatuses using thereof are effective to realize the image display apparatuses that require especially high resolution.

What is claimed is:

1. An electron emission device in which a cathode electrode, an insulating layer, and a gate electrode are layered on a substrate in an order, and an electron emission layer is disposed on the substrate in a first hole penetrating from the gate electrode through the cathode electrode,
    the electron emission layer being positioned between an upper surface of the substrate and a boundary between the cathode electrode and the insulating layer, wherein a surface of the electron emission layer includes a contact area, in contact with the cathode electrode, and a non-contact area, not in contact with the cathode electrode, the non-contact area including a central part of a bottom surface of the electron emission layer disposed on the substrate.

2. An electron emission device according to claim 1, wherein
    a distance between the upper surface of the electron emission layer and the boundary between the cathode electrode and the insulating layer measured in a direction of lamination is in a range of 2% to 15% inclusive of a width of an opening of the first hole.

3. An electron emission device according to claim 1, wherein
    the upper surface of the electron emission layer is concave.

4. An electron emission device according to claim 3, wherein
    the lower surface of the electron emission layer is convex.

5. An electron emission device according to claim 1, wherein
    the electron emission layer includes at least one projection on the upper surface.

6. An electron emission device according to claim 5, wherein
    more than one projection is formed on the electron emission layer, and
    a height H and a distance D are set so as to fulfill an equation $D \geq H/2$,
    H being the height of the projection, and D being the distance between two tips of the adjacent projections.

7. An electron emission device according to claim 5, wherein
    the electron emission layer includes an emission layer for emitting electrons and an orientation layer for orientating the emission layer, the orientation layer having a concave and a convex on an upper surface thereof, and
    the emission layer has a concave and a convex on an upper surface thereof according to the upper surface of the orientation layer.

8. An electron emission device according to claim 1, wherein
    the electron emission layer having a second hole in a center thereof.

9. An electron emission device according to claim 1, wherein
    the cathode electrode includes a protrusion at a rim part of the bottom of the first hole, the protrusion extending toward the central area.

10. An electron emission device according to claim 1, wherein
    the cathode electrode is disposed on the substrate with a second cathode electrode interposed therebetween, the second cathode electrode being made of a different kind of conductive material from the cathode electrode, and
    the second cathode electrode includes a protrusion at a rim part of the bottom of the first hole, the protrusion extending toward the central area.

11. An electron emission device according to claim 1, wherein
    the electron emission layer includes an electron emission material which is one of a fibrous graphite and a carbon nano-tube.

12. An electron emission device according to claim 11, wherein
    the electron emission layer includes orientation members having a multi-projection shape.

13. An image display apparatus comprising a first panel and a second panel, the first panel having electron emission devices disposed in matrix on a substrate, the electron emission devices being for emitting electron beams, the first and the second panels facing each other with a gap material sandwiched therebetween; wherein
    the electron emission device is the electron emission device according to claim 1.

14. An electron emission device in which a cathode electrode, an insulating layer, and a gate electrode are layered on a substrate in an order, and an electron emission layer is disposed in a first hole on the substrate, the first hole penetrating to the gate electrode through the cathode electrode, wherein
    an upper surface of the electron emission layer is positioned between an upper surface of the substrate and a boundary between the cathode electrode and the insulating layer, and
    a distance between the upper surface of the electron emission layer and the boundary between the cathode electrode and the insulating layer measured in a direction of lamination is in a range of 2%–15% inclusive of a width of an opening of the first hole.

15. An electron emission device according to claim 14, wherein
    the electron emission layer includes at least one projection on the upper surface.

16. An electron emission device according to claim 15, wherein
    more than one projection is formed on the electron emission layer, and
    a height H and a distance D are set so as to fulfill an equation $D \geq H/2$,
    H being the height of the projection, and D being the distance between two tips of the adjacent projections.

17. An electron emission device according to claim 15, wherein the electron emission layer includes an emission layer for emitting electrons and an orientation layer for orientating the emission layer, the orientation layer having a concave and a convex on an upper surface thereof, and
    the emission layer has a concave and a convex on an upper surface thereof according to the upper surface of the orientation layer.

18. An electron emission device according to claim 14, wherein
the electron emission layer having a second hole in a center thereof.

19. An electron emission device according to claim 14, wherein
the electron emission layer includes an electron emission material which is one of a fibrous graphite and a carbon nano-tube.

20. An electron emission device according to claim 19, wherein
the electron emission layer includes orientation members having a multi-projection shape.

21. An image display apparatus comprising a first panel and a second panel, the first panel having electron emission devices disposed in matrix on a substrate, the electron emission devices being for emitting electron beams, the first and the second panels facing each other with a gap material sandwiched therebetween; wherein
the electron emission device is the electron emission device according to claim 14.

22. An electron emission device in which a cathode electrode, an insulating layer, and a gate electrode are layered on a substrate in an order, and an electron emission layer is disposed in a first hole on the substrate, the first hole penetrating from the gate electrode into the cathode electrode, wherein
an upper surface of the electron emission layer includes a concave portion having a concave lens shape.

23. An electron emission device according to claim 22, wherein
an upper surface of the electron emission layer is positioned between an upper surface of the substrate and a boundary between the cathode electrode and the insulating layer.

24. An electron emission device according to claim 22, wherein
a distance between the upper surface of the electron emission layer and the boundary between the cathode electrode and the insulating layer measured in a direction of lamination is in a range of 2%–15% inclusive of a width of an opening of the first hole.

25. An electron emission device according to claim 22, wherein
the lower surface of the electron emission layer is convex.

26. An electron emission device according to claim 22, wherein
the electron emission layer includes a plurality of projections on the upper surface, the concave portion being positioned between adjacent projections.

27. An electron emission device according to claim 26, wherein $$D \geq H/2,$$

where H is a height of the projection, and D is a distance between two tips of the adjacent projections.

28. An electron emission device according to claim 22, wherein
the electron emission layer includes an electron emission material which is one of a fibrous graphite and a carbon nano-tube.

29. An electron emission device according to claim 28, wherein
the electron emission layer includes orientation members having a multi-projection shape.

30. An image display apparatus comprising a first panel and a second panel, the first panel having electron emission devices disposed in matrix on a substrate, the electron emission devices being for emitting electron beams, the first and the second panels facing each other with a gap material sandwiched therebetween; wherein
the electron emission device is the electron emission device according to claim 22.

* * * * *